United States Patent
Huang et al.

(10) Patent No.: US 11,933,604 B2
(45) Date of Patent: Mar. 19, 2024

(54) DETECTION METHOD AND APPARATUS FOR AUTOMATIC DRIVING SENSOR, AND ELECTRONIC DEVICE

(71) Applicant: APOLLO INTELLIGENT DRIVING TECHNOLOGY (BEIJING) CO., LTD., Beijing (CN)

(72) Inventors: Xuan Huang, Beijing (CN); Nan Wu, Beijing (CN); Xun Zhou, Beijing (CN); Jingjing Xue, Beijing (CN); Yingnan Liu, Beijing (CN)

(73) Assignee: APOLLO INTELLIGENT DRIVING TECHNOLOGY (BEIJING) CO., LTD. (CN)

( * ) Notice: Subject to any disclaimer, the term of this patent is extended or adjusted under 35 U.S.C. 154(b) by 660 days.

(21) Appl. No.: 17/125,207

(22) Filed: Dec. 17, 2020

(65) Prior Publication Data

US 2021/0103741 A1    Apr. 8, 2021

Related U.S. Application Data

(63) Continuation of application No. PCT/CN2019/126304, filed on Dec. 18, 2019.

(30) Foreign Application Priority Data

Jan. 16, 2019   (CN) .......................... 201910039103.1

(51) Int. Cl.
*G01B 11/26* (2006.01)
*G01S 17/931* (2020.01)
(Continued)

(52) U.S. Cl.
CPC ............ *G01B 11/26* (2013.01); *G01S 17/931* (2020.01); *G05D 1/0257* (2013.01); *G06V 10/245* (2022.01); *G06V 20/56* (2022.01)

(58) Field of Classification Search
CPC ....... G01B 11/26; G01S 17/931; G01S 17/86; G01S 7/4808; G01S 7/4972; G01S 7/497;
(Continued)

(56) References Cited

U.S. PATENT DOCUMENTS

| 2010/0076709 A1* | 3/2010 | Hukkeri | G01S 17/87 356/6 |
| 2016/0161602 A1* | 6/2016 | Prokhorov | G01S 7/4972 702/97 |

(Continued)

FOREIGN PATENT DOCUMENTS

| CN | 101023322 A | 8/2007 |
| CN | 102501252 A | 6/2012 |

(Continued)

OTHER PUBLICATIONS

Wangze, Du et al., Fast image stitching under single camera rotate monitoring, Journal of Image and Graphics, 2016, 21 (2), pp. 245-254.

(Continued)

*Primary Examiner* — Michael J Zanelli
(74) *Attorney, Agent, or Firm* — Dilworth IP, LLC

(57) ABSTRACT

The embodiments of the present disclosure provide a detection method, apparatus for automatic driving sensor, and electronic device. The method includes: pre-establishing a standard association relationship, the sensor to-be-detected is used for capturing in a fixed scene, and a corresponding capturing result is displayed.

15 Claims, 5 Drawing Sheets

(51) Int. Cl.
  *G05D 1/00* (2006.01)
  *G06V 10/24* (2022.01)
  *G06V 20/56* (2022.01)

(58) Field of Classification Search
  CPC .. G05D 1/0246; G05D 1/0257; G05D 1/0248; G06V 10/245; G06V 20/56; H04N 17/00; H04N 17/002; G01D 18/00
  See application file for complete search history.

(56) References Cited

U.S. PATENT DOCUMENTS

| | | | |
|---|---|---|---|
| 2019/0004159 A1 | 1/2019 | Lee et al. | |
| 2019/0204425 A1* | 7/2019 | Abari | G01S 7/497 |
| 2020/0394445 A1* | 12/2020 | Han | G06T 7/80 |

FOREIGN PATENT DOCUMENTS

| | | | | |
|---|---|---|---|---|
| CN | 102759953 | A | 10/2012 | |
| CN | 103863205 | A | 6/2014 | |
| CN | 103945123 | A | 7/2014 | |
| CN | 106303206 | A | 1/2017 | |
| CN | 107247268 | A | 10/2017 | |
| CN | 206594292 | U | 10/2017 | |
| CN | 107479061 | A | 12/2017 | |
| CN | 107966495 | A | 4/2018 | |
| CN | 108229410 | A | 6/2018 | |
| CN | 108280828 | A | 7/2018 | |
| CN | 108406297 | A | 8/2018 | |
| CN | 207937339 | A | 10/2018 | |
| CN | 109212543 | A | 1/2019 | |
| CN | 109855568 | A | 6/2019 | |
| DE | 102013222291 | A1 * | 5/2015 | ............ G01C 25/00 |
| JP | 2007064684 | A | 3/2007 | |
| JP | 2011198002 | A | 10/2011 | |
| JP | 6280674 | B1 | 2/2018 | |
| WO | 2018100717 | A1 | 6/2018 | |

OTHER PUBLICATIONS

Liu, Chang-qing et al., Design on the Automatic Adjusting Device of the Medium and Small Goods Detection Based on Machine Vision, Automation & Instrumentation, 2017, 32 (10), pp. 72-76.
Notification to Grant Patent Right for Invention in CN Patent Application No. 201910039103.1 dated Mar. 29, 2021.
International Search Report in PCT/CN2019/126304 dated Mar. 20, 2020.
First Office Action in CN Patent Application No. 201910039103.1 dated Jan. 21, 2020.
First Office Action in CN Patent Application No. 202110686350.8 dated May 13, 2022.

* cited by examiner

DETECTION METHOD AND APPARATUS
FOR AUTOMATIC DRIVING SENSOR, AND
ELECTRONIC DEVICE

CROSS-REFERENCE TO RELATED APPLICATIONS

This application is a continuation of International Application No. PCT/CN2019/126304, filed on Dec. 18, 2019, which claims priority to Chinese Patent Application No. 201910039103.1, filed on Jan. 16, 2019. The disclosures of the aforementioned applications are hereby incorporated by reference in their entireties.

TECHNICAL FIELD

The embodiments of the present disclosure relate to the field of intelligent driving technology and, in particular, to a detection method and a detection apparatus for automatic driving sensor, and electronic device.

BACKGROUND

Environmental awareness is one of the core capabilities of the autonomous driving system, and the realization of environmental awareness mainly relies on a variety of sensors, such as cameras and laser-radar. The installation position and the installation angle of the sensor have a big impact on the environment perception algorithm. Therefore, in the process of installing the sensor, it is particularly important to ensure the accuracy of the installation position.

SUMMARY

The embodiments of the present disclosure provide a detection method and a detection apparatus for automatic driving sensor, and electronic device to improve detection efficiency.

In the first aspect, an embodiment of the present disclosure provides a detection method for automatic driving sensor, including:

pre-establishing a standard association relationship, wherein the standard association relationship is a corresponding relationship between ID information and a standard capturing result of a sensor to-be-detected in a fixed scene when the sensor to-be-detected is correctly installed;

using the sensor to-be-detected to capture in a fixed scene and display a corresponding capturing result;

outputting a first detection result according to the capturing result and the standard association relationship, where the first detection result is configured to indicate whether an installation sequence of the sensor to-be-detected is correct.

With reference to the first aspect, in a first implementation manner of the first aspect of the present disclosure, the sensor to-be-detected includes: a camera or a laser-radar; and correspondingly, the capturing result of the camera is a captured image, and the capturing result of the laser-radar is a captured point cloud.

In combination with the first aspect, in a second implementation manner of the first aspect of the present disclosure, if the installation sequence of the sensors to-be-detected is incorrect, the method further includes:

adjusting the installation sequence of the sensors to-be-detected according to the standard association relationship.

With reference to the first aspect, in a third implementation manner of the first aspect of the present disclosure, the method further includes:

detecting an installation angle of the sensor to-be-detected according to a position of a target object in the capturing result and a standard reference mark, and outputting a second detection result, wherein, the second detection result is configured to indicate whether the installation angle of the sensor to-be-detected is accurate.

With reference to the third implementation manner of the first aspect of the present disclosure, in a fourth implementation manner of the first aspect of the present disclosure, if the installation angle of the sensor to-be-detected is not accurate, the method further includes:

adjusting one or more of a horizontal angle, a pitch angle and a rotation angle of the sensor to-be-detected, according to the position of the target object in the capturing result and the standard reference mark.

With reference to the third implementation manner of the first aspect of the present disclosure, in a fifth implementation manner of the first aspect of the present disclosure, the standard reference mark is determined through following manners:

identifying one target object in the standard capturing result, and setting a standard reference mark at the position of the target object, which is a contour line of the target object, a horizontal line, or a vertical line;

or, identifying multiple target objects in the standard capturing result, and setting a standard reference mark at the positions of the multiple target objects, where the standard reference mark is a line connecting center points of the multiple target objects.

With reference to the third implementation manner of the first aspect of the present disclosure, in a sixth implementation manner of the first aspect of the present disclosure, after the adjusting one or more of a horizontal angle, a pitch angle and a rotation angle of the sensor to-be-detected, according to the position of the target object in the capturing result and the standard reference mark, further including:

fixing the sensor to-be-detected.

In a second aspect, the present disclosure provides a detection apparatus for automatic driving sensor, including:

a standard establishment module, configured to establish a standard association relationship in advance, wherein the standard association relationship is a corresponding relationship between ID information and a standard capturing result of a sensor to-be-detected in a fixed scene when the sensor to-be-detected is correctly installed;

a display module, configured to display a corresponding capturing result when the sensor to-be-detected is used for capturing in a fixed scene; and a first detection module, configured to output a first detection result according to the capturing result and the standard association relationship, where the first detection result is configured to indicate whether an installation sequence of the sensor to-be-detected is correct.

With reference to the second aspect, in a first implementation manner of the second aspect of the present disclosure, the sensor to-be-detected includes: a camera or a laser-radar;

correspondingly, the capturing result of the camera is a captured image, and the capturing result of the laser-radar is a captured point cloud.

With reference to the second aspect, in a second implementation manner of the second aspect of the present disclosure, the foregoing apparatus further includes: an adjustment module.

The adjustment module is configured to adjust the installation sequence of the sensors to-be-detected according to the standard association relationship when the installation sequence of the sensor to-be-detected is incorrect.

With reference to the second aspect, in a third implementation manner of the second aspect of the present disclosure, the apparatus further includes:

a second detection module, configured to detect an installation angle of the sensor to-be-detected according to a position of a target object in the capturing result and a standard reference mark, and output a second detection result, wherein, the second detection result is configured to indicate whether the installation angle of the sensor to-be-detected is accurate.

With reference to the third implementation manner of the second aspect of the present disclosure, in a fourth implementation manner of the second aspect of the present disclosure, The adjustment module is also configured to adjust one or more of a horizontal angle, a pitch angle and a rotation angle of the sensor to-be-detected, according to the position of the target object in the capturing result and the standard reference mark when the installation angle of the sensor to-be-detected is not accurate.

With reference to the third implementation manner of the second aspect of the present disclosure, in a fifth implementation manner of the second aspect of the present disclosure, the apparatus also includes: a determining module; where, the determining module is configured to determine a standard reference mark through following manners:

identifying one target object in the standard capturing result, and setting a standard reference mark at the position of the target object, which is a contour line of the target object, a horizontal line, or a vertical line;

or identifying multiple target objects in the standard capturing result, and setting a standard reference mark at the positions of the multiple target objects, where the standard reference mark is a line connecting center points of the multiple target objects.

With reference to the third implementation manner of the second aspect of the present disclosure, in a sixth implementation manner of the second aspect of the present disclosure, the apparatus further includes: a fixing module; where, the fixing module is configured to fix the sensor to-be-detected, after the adjustment of one or more of a horizontal angle, a pitch angle and a rotation angle of the sensor to-be-detected, according to the position of the target object in the capturing result and the standard reference mark.

In a third aspect, the present disclosure provides an electronic device including: a memory, a processor, and a display; where, the memory is configured to store computer programs;

the display is configured to display a capturing result of a sensor to-be-detected in a fixed scene; and the processor is configured to execute the computer program to execute the method described in any one of the first aspect.

In a fourth aspect, the present disclosure provides a computer-readable storage medium in which a computer program is stored, and when the computer program is executed by a processor, the method according to any one of the first aspects is executed.

The embodiments of the present disclosure provide a detection method and a detection apparatus for automatic driving sensor, and electronic device, achieved by means of pre-establishing a standard association relationship, using the sensor to-be-detected to capture in a fixed scene and display the corresponding capturing result, and outputting the first detection result according to the capturing result and the foregoing standard association relationship, where the first detection result is used to indicate whether the installation sequence of the sensors to-be-detected is correct.

BRIEF DESCRIPTION OF DRAWINGS

In order to explain the embodiments of the present disclosure more clearly, the following will briefly introduce the drawings that need to be used in the description of the embodiments. Obviously, the drawings in the following description are some embodiments of the present disclosure. For those of ordinary skill in the art, other drawings can be obtained based on these drawings without creative work.

DESCRIPTION OF EMBODIMENTS

Figure 1:
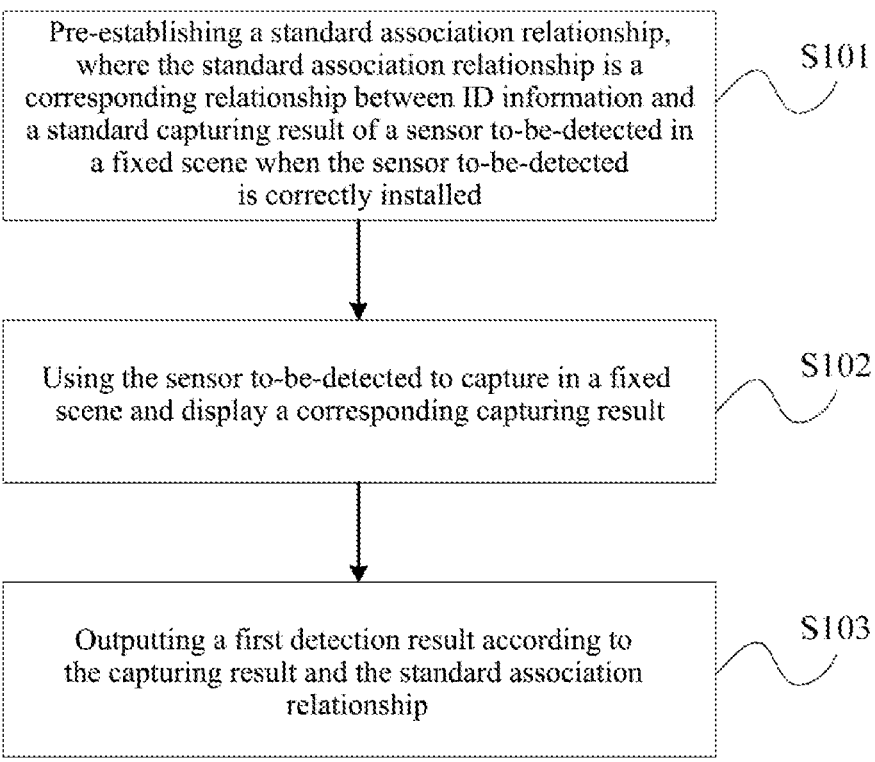
FIG. 1 is a schematic flowchart of Embodiment I of a detection method for automatic driving sensor provided by the present disclosure.

In order to make the objectives, technical solutions, and advantages of the embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure, rather than all of the embodiments. Based on the embodiments of the present disclosure, all other embodiments obtained by those of ordinary skill in the art without creative work shall fall within the protection scope of the present disclosure.

In the embodiments of the present disclosure, "and/or" describes the association relationship of the associated objects, which means that there can be three relationships, for example, A and/or B, which can mean: only A, both A and B, and only B, Where A and B can be singular or plural. The character "/" generally indicates that the associated objects are in an "or" relationship. "The following at least one item (a)" or similar expressions refers to any combination of these items, including any combination of single item (a) or plural items (a). For example, at least one item (a) of a, b, or c can mean: a, b, c, a-b, a-c, b-c, or a-b-c, where a, b, and c can be single or more.

At present, environmental awareness is one of the core capabilities of the autonomous driving system, and the realization of environmental awareness mainly relies on a variety of automatic driving sensors, such as cameras and laser-radar. The installation position and the installation angle of the sensor have a big impact on the environment perception algorithm. Therefore, in the process of installing the sensor, it is particularly important to ensure the accuracy of an installation position and an installation angle.

However, in the process of sensor installation, due to operating errors of the installer or other reasons, the installation sequence or installation angle of multiple sensors is inaccurate, which cannot meet the design requirements. Therefore, the installation of sensors installed on the vehicle should be detected before the vehicle is put into operation or put into use.

In the prior art, the detection of whether multiple sensors have an incorrect installation sequence is mainly performed manually, resulting in low detection efficiency.

Based on the problems in the prior art, the embodiments of the present disclosure provide a detection method for automatic driving sensor to improve detection efficiency. The method of the embodiment of the present disclosure can effectively ensure the accuracy of the detection result by automatically identifying whether the installation sequence of the sensors is correct, and effectively improve the detection efficiency. In addition, the first detection result and the standard association relationship can also provide a reliable basis for adjusting the installation sequence of the sensors to-be-detected.

It should be noted that the method of the embodiments of the present disclosure can be applied to a scenario where the autonomous driving sensor installed on the vehicle is detected and calibrated before the unmanned vehicle is put into operation, so as to ensure that the autonomous driving sensors installed on driverless vehicles put into operation can accurately perceive road environment information.

Of course, the method of the embodiments of the present disclosure can also be applied to scenarios where a manually driven vehicle detects and calibrates multiple automatic driving sensors installed on the vehicle to ensure that the automatic driving sensors installed on the vehicle can accurately perceive road environment information.

The technical solution of the present application will be described in detail below with specific embodiments. The following specific embodiments can be combined with each other, and the same or similar concepts or processes may not be repeated in some embodiments.

FIG. 1 is a schematic flowchart of Embodiment I of a detection method for automatic driving sensor provided by the present disclosure. The execution subject of the detection method for automatic driving sensor provided by the embodiment of the present disclosure is the detection device for the automatic driving sensor or electronic device provided by the embodiments of the present disclosure. Exemplarily, the electronic device may be, but not limited to, a computer, a smart phone, or a tablet etc. In this embodiment, the execution subject is an electronic device as an example for detailed description.

As shown in FIG. 1, the method of this embodiment includes:

S101. Pre-establishing a standard association relationship, where the standard association relationship is a corresponding relationship between ID information and a standard capturing result of a sensor to-be-detected in a fixed scene when the sensor to-be-detected is correctly installed.

Optionally, the sensor to-be-detected includes a camera or a laser-radar. Correspondingly, the capturing result of the camera is a captured image, and the capturing result of the laser-radar is a captured point cloud. Then, it can be understood that if the sensor to-be-detected is a camera, the pre-established standard association relationship is the corresponding relationship between the standard captured image and the camera ID information when it is correctly installed; If the sensor to-be-detected is a laser-radar, the pre-established standard association relationship is the corresponding relationship between the standard captured point cloud and the laser-radar ID information. The identification (ID) information may be an identification number assigned by the user to the sensor. When the sensor to-be-detected is a laser-radar, the ID information may also be Internet Protocol Address (IP address) information corresponding to the laser-radar.

Optionally, the standard captured image may be a captured image of a standard camera in a fixed scene, and the standard captured point cloud may be a captured point cloud of a standard laser-radar in a fixed scene.

In addition, it should be noted that the fixed scene in this embodiment may be a pre-established standard test room, where the vehicle can be parked at a preset position in the standard test room, and the sensors installed on the vehicle can capture the fixed scenes in the corresponding direction in the standard test room. Therefore, a sensor installed on a standard vehicle can be used to capture a fixed scene in a corresponding direction in a standard test room to obtain standard capturing results.

Exemplarily, a possible way to establish a standard association relationship in advance is: the electronic device can display the corresponding input interface according to the user's instruction, the user can input a set of corresponding standard capturing results and sensor ID information on the input interface, and the electronic device generates a set of standard association relationships according to the standard capturing result input by the user and the ID information of the sensor. If the vehicle to-be-detected includes multiple sensors to-be-detected, the foregoing steps are repeated to input the standard association relationship corresponding to the multiple sensors to-be-detected into the electronic device.

Exemplarily, another possible way to establish a standard association relationship in advance is: the standard association relationship is stored in a storage medium in the form of a document, and the electronic device is connected to the storage medium, and the user imports the standard association relationship into the electronic device through corresponding control instructions.

S102. Using the sensor to-be-detected to capture in a fixed scene and display a corresponding capturing result.

In this step, the electronic device displays a capturing result of the sensor to-be-detected in a fixed scene on the display unit of the electronic device, where the display unit may be a display screen or a display component.

Specifically, if the sensor to-be-detected is a camera, the electronic device displays the captured image of the camera in a fixed scene on the display unit. Exemplarily, if the camera is installed at left front position of the vehicle to-be-detected, the camera is used to capture the left front area of the vehicle in a fixed scene, and the electronic device displays the captured image on the display unit. If the camera is installed at right front position of the vehicle to-be-detected, the camera is used to capture the right front area of the vehicle in a fixed scene, and the electronic device displays the captured image on the display unit.

If the sensor to-be-detected is a laser-radar, the electronic device displays the captured point cloud of the laser-radar in a fixed scene on the display unit. Exemplarily, if the laser-radar is installed at the left front position of the vehicle to-be-detected, the laser-radar is used to capture the left front area of the vehicle in a fixed scene, and the electronic device displays the captured point cloud on the display unit. If the laser-radar is installed at the right front position of the vehicle to-be-detected, the laser-radar is used to capture the right front area of the vehicle in a fixed scene, and the electronic device displays the captured point cloud on the display unit.

S103. Outputting a first detection result according to the capturing result and the standard association relationship.

The first detection result is configured to indicate whether an installation sequence of the sensor to-be-detected is correct.

Exemplarily, the electronic device determines whether the current installation sequence of the sensor to-be-detected is correct according to the capturing result and the standard capturing result in the standard association relationship.

The following is a detailed description of the two different situations where the sensor to-be-detected is a camera and the sensor to-be-detected is a laser-radar:

1. The Sensor to-be-Detected is a Camera

One possible implementation is that the electronic device uses image identification technology to identify a target object in the captured image and a target object in the standard captured image, respectively, if the features of the target object in the captured image are consistent with the features of the target object in the standard captured image, then the electronic device outputs a prompt message "the installation sequence is correct" on the display unit; if the features of the target object in the captured image is inconsistent with the features of the target object in the standard captured image, then the electronic device outputs a prompt message "the installation sequence is incorrect" on the display unit.

The electronic device automatically identifies whether the camera installation sequence is correct, and outputs the detection results, which not only ensures the accuracy of the detection results, but also improves the detection efficiency.

In another possible implementation manner, the electronic device displays the captured image in the first preset area of the display unit, and displays the standard captured image in the second preset area of the display unit; then, the electronic device uses image identification technology to identify a target object in the captured image and a target object in the standard captured image respectively. If the features of the target object in the captured image are consistent with the features of the target object in the standard captured image, then the electronic device outputs a prompt message "the installation sequence is correct" on the display unit. Since the captured image and the standard captured image are displayed in different areas of the display unit, and the relevant staff can also observe whether the target in the captured image is consistent with the target in the standard captured image, and the electronic device can also display a prompt box, which includes a prompt message of "Manually confirm whether it is consistent" and the following related buttons: "Yes" and "No". Relevant staff can click the "Yes" or "No" button to input the manually confirmed test results. If the manually confirmed test results are consistent with the automatically confirmed results by the electronic device, then the installation sequence of the camera can be determined to be accurate;

if the features of the target object in the captured image are inconsistent with the features of the target object in the standard captured image, then the electronic device outputs a prompt message "the installation sequence is incorrect" on the display unit. Since the captured image and the standard captured image are displayed in different areas of the display unit, and the relevant staff can also observe whether the target in the captured image is consistent with the target in the standard captured image, and the electronic device can also display a prompt box, which includes a prompt message of "Manually confirm whether it is consistent" and the following related buttons: "Yes" and "No". Relevant staff can click the "Yes" or "No" button to input the manually confirmed test results. If the manually confirmed test results are consistent with the automatically confirmed results by the electronic device, then the installation sequence of the camera can be determined to be incorrect;

The electronic device automatically identifies whether the camera installation sequence is correct, and outputs the detection results, which not only ensures the accuracy of the detection results, but also improves the detection efficiency. In addition, the manually confirmed test result is compared with the identification result of the electronic device, which further improves the accuracy of the detection result.

2. The Sensor to-be-Detected is a Laser-Radar

One possible implementation is that the electronic device uses image identification technology to identify a target object in the captured point cloud and a target object in the standard captured point cloud, respectively; if the features of the target object in the captured point cloud are consistent with the features of the target object in the standard captured point cloud, then the electronic device outputs a prompt message "the installation sequence is correct" on the display unit; if the features of the target object in the captured point cloud are inconsistent with the features of the target object in the standard captured point cloud, then the electronic device outputs a prompt message "the installation sequence is incorrect" on the display unit.

The electronic device automatically identifies whether the laser-radar installation sequence is correct, and outputs the detection results, which not only ensures the accuracy of the detection results, but also improves the detection efficiency.

In another possible implementation manner, the electronic device displays the captured point cloud in the first preset area of the display unit, and displays the standard captured point cloud in the second preset area of the display unit; then, the electronic device uses image identification technology to identify a target object in the captured image and a target object in the standard captured point cloud respectively. If the features of the target object in the captured point cloud are consistent with the features of the target object in the standard captured point cloud, then the electronic device outputs a prompt message "the installation sequence is correct" on the display unit. Since the captured point cloud and the standard captured point cloud are displayed in different areas of the display unit, and the relevant staff can also observe whether the target in the captured point cloud is consistent with the target in the standard captured point cloud, and the electronic device can also display a prompt box, which includes a prompt message of "Manually confirm whether it is consistent" and the following related buttons: "Yes" and "No". Relevant staff can click the "Yes" or "No" button to input the manually confirmed test results. If the manually confirmed test results are consistent with the automatically confirmed results by the electronic device, then the installation sequence of the camera can be determined to be accurate;

if the features of the target object in the captured point cloud is inconsistent with the features of the target object in the standard captured point cloud, then the electronic device outputs a prompt message "the installation sequence is incorrect" on the display unit. Since the captured point cloud and the standard captured point cloud are displayed in different areas of the display screen, and the relevant staff can also observe whether the target in the captured point cloud is consistent with the target in the standard captured point cloud, the electronic device can also display a prompt box, which includes a prompt message of "Manually confirm whether it is consistent" and the following related buttons: "Yes" and "No". Relevant staff can click the "Yes" or "No" button to input the manually confirmed test results. If the manually confirmed test results are consistent with the automatically confirmed results by the electronic device, then the installation sequence of the camera can be determined to be incorrect.

The electronic device automatically identifies whether the laser-radar installation sequence is correct, and outputs the detection results, which not only ensures the accuracy of the detection results, but also improves the detection efficiency. In addition, the manually confirmed test result is compared with the identification result of the electronic device, which further improves the accuracy of the detection result.

It should be noted that the captured image or the captured point cloud and the foregoing prompt message may also be displayed on the display unit in other forms of layout, and are not limited to the form described in this embodiment.

In this embodiment, by pre-establishing a standard association relationship, the sensor to-be-detected is used for capturing in a fixed scene and displaying a corresponding capturing result. That is, the method of the embodiment can effectively ensure the accuracy of the detection result by automatically identifying whether the installation sequence of the sensors is correct, and effectively improve the detection efficiency. In addition, the first detection result and the standard association relationship can also provide a reliable basis for adjusting the installation sequence of the sensors to-be-detected.

Figure 2:
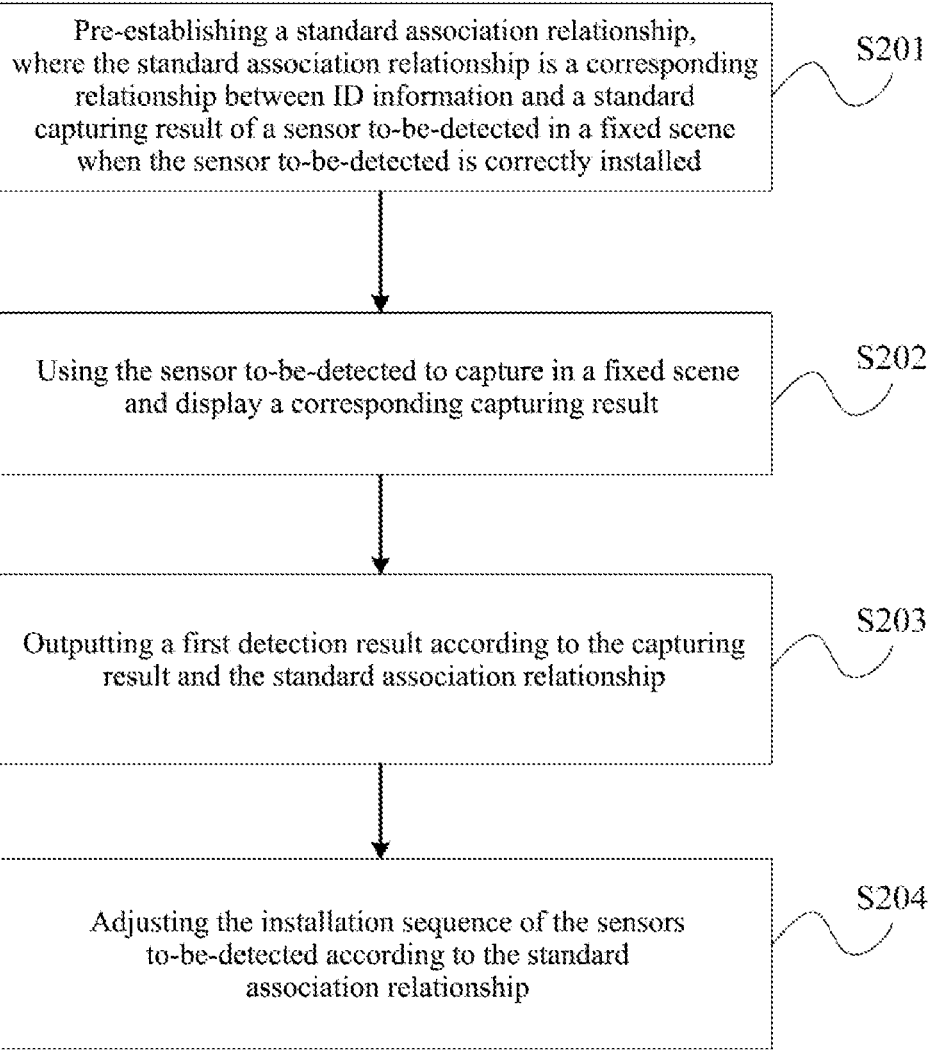
FIG. 2 is a schematic flowchart of Embodiment II of a detection method for automatic driving sensor provided by the present disclosure.

FIG. 2 is a schematic flowchart of Embodiment II of the detection method for automatic driving sensor provided by the present disclosure. As shown in FIG. 2, the method of this embodiment includes:

S201. Pre-establishing a standard association relationship, where the standard association relationship is a corresponding relationship between ID information and a standard capturing result of a sensor to-be-detected in a fixed scene when the sensor to-be-detected is correctly installed.

S202. Using the sensor to-be-detected to capture in a fixed scene and display a corresponding capturing result.

S203. Outputting a first detection result according to the capturing result and the standard association relationship.

Steps S201-S203 in this embodiment are similar to steps S101-S103 in the embodiment shown in FIG. 1, and will not be repeated here.

Further, if a first detection result output by the electronic device indicates that an installation sequence of the laser-radars to-be-detected is incorrect, and then step S204 may be executed.

S204. Adjusting the installation sequence of the sensors to-be-detected according to the standard association relationship.

The two situations where the sensor to-be-detected is a camera and the sensor to-be-detected is a laser-radar are separately explained:

1. The Sensor to-be-Detected is a Camera

One possible implementation manner is that: the ID information of the camera that should be installed at the current installation location when the correct installation is determined according to the standard association relationship; according to the ID information, the parameter information of the camera corresponding to the foregoing ID information is determined, and the electronic device can adjust the installation sequence of the camera by updating the parameter information of the camera at the current position.

Another possible implementation manner is that: the electronic device determines the correct installation position of the camera according to the standard association relationship, removes the camera from the current position, and installs it to the correct installation position.

2. The Sensor to-be-Detected is a Laser-Radar

One possible implementation manner is that: the ID information of the laser-radar that should be installed at the current installation location when the correct installation is determined according to the standard association relationship; according to the ID information, the parameter information of the laser-radar corresponding to the foregoing ID information is determined, and the electronic device can adjust the installation sequence of the laser-radar by updating the parameter information of the laser-radar at the current position.

Another possible implementation manner is that: the electronic device determines the correct installation position of the laser-radar according to the standard association relationship, removes the laser-radar from the current position, and installs it to the correct installation position.

In this embodiment, pre-establish a standard association relationship, use the sensor to-be-detected to capture in a fixed scene and display a corresponding capturing result, and then output the first detection result according to the standard association relationship, where the first detection result indicates whether the installation sequence of the sensors to-be-detected is incorrect, and further adjust the installation sequence of the sensors to-be-detected according to the standard association relationship. The method of the embodiment can effectively ensure the accuracy of the detection result and effectively improve the detection efficiency by automatically identifying whether the installation sequence of the sensors is correct. In addition, the installation sequence of the sensors to-be-detected is adjusted according to the first detection result and the standard association relationship, which has high reliability.

It should be noted that by repeatedly executing the method of the embodiments shown in FIG. 1 or FIG. 2, the installation sequence of the multiple sensors installed on the vehicle to-be-detected can be detected, and the sensors with the incorrect installation sequence can also be adjusted according to the detection results.

Figure 3:
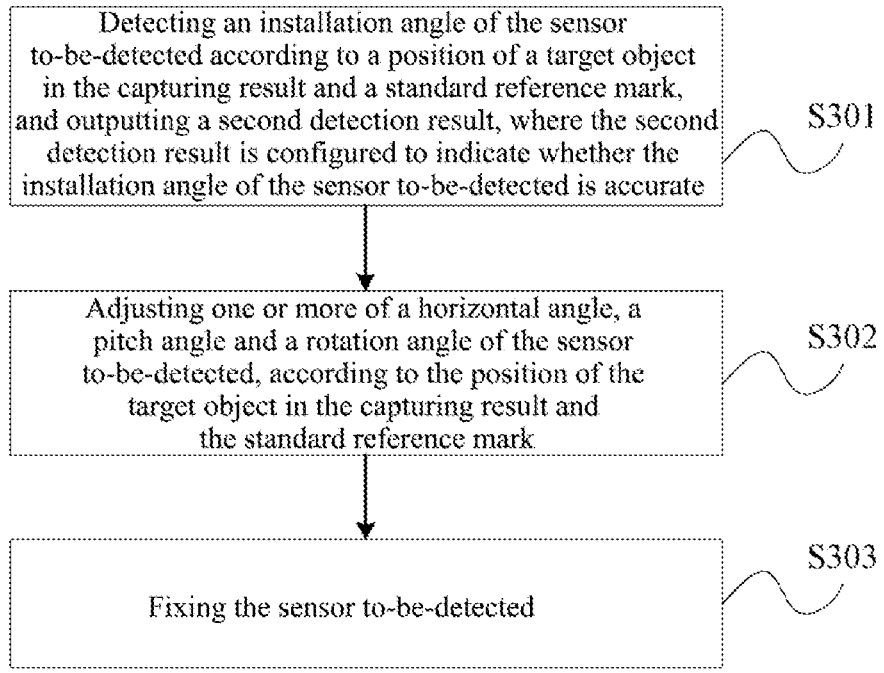
FIG. 3 is a schematic flowchart of Embodiment III of a detection method for automatic driving sensor provided by the present disclosure.

FIG. 3 is a schematic flowchart of Embodiment III of a detection method for automatic driving sensor provided by the present disclosure. The method in this embodiment may be executed after step S103 in the embodiment shown in FIG. 1, or may be executed after step S204 in the embodiment shown in FIG. 2.

As shown in FIG. 3, the method of this embodiment includes:

S301. Detecting an installation angle of the sensor to-be-detected according to a position of a target object in the capturing result and a standard reference mark, and outputting a second detection result, where the second detection result is configured to indicate whether the installation angle of the sensor to-be-detected is accurate.

In this step, the standard reference mark is a mark corresponding to the position of the target object in the standard capturing result. The standard reference mark may be external to the display unit by using a mold, or may be a reference mark set in the pixel area corresponding to the target object in the display unit when the standard captured image is displayed in a preset manner.

Specifically, the electronic device can determine whether the installation angle of the sensor is accurate by judging whether the position of the target object in the capturing result overlaps with the standard reference mark.

Exemplarily, the standard reference mark is determined through the following manners:

the electronic device identifies one target object in the standard capturing result, and sets a standard reference mark at the position of the target object, which is a contour line of the target object, a horizontal line, or a vertical line;

or the electronic device identifies multiple target objects in the standard capturing result, and sets a standard reference mark at the positions of the multiple target objects, which is a line connecting center points of the multiple target objects.

Optionally, the target object may be a wall joint in a standard test room, a marker placed in the standard test room, one or more two-dimensional code patterns set on the wall of the standard test room, etc.

Preferably, for the camera installed on the left front of the vehicle to-be-detected, the target object can be set as the wall joint corresponding to the left front of the standard test room, then the standard reference mark is the vertical line corresponding to the wall joint; for the camera installed on the right front of the vehicle to-be-detected, the target object can be set as the wall joint corresponding to the left front of the standard test room, then the standard reference mark is the vertical line corresponding to the wall joint; for the camera installed on the back of the vehicle to be inspected, the target object can be set to one or more QR codes corresponding to the back of the standard test room. Then, when the number of QR codes is one, the standard reference mark can be the contour line corresponding to the QR code, when the number of two-dimensional codes is multiple, the standard reference mark can be a line connecting center points of multiple two-dimensional codes.

Preferably, for the laser-radar installed on the vehicle to-be-detected, the target can be set as a landmark that is placed in a preset position in the standard test room and can be recognized by the laser-radar.

S302. Adjusting one or more of a horizontal angle, a pitch angle and a rotation angle of the sensor to-be-detected, according to the position of the target object in the capturing result and the standard reference mark.

The two situations where the sensor to-be-detected is a camera and the sensor to-be-detected is a laser-radar are separately explained:

1. The Sensor to-be-Detected is a Camera

Exemplarily, according to the position of the target object in the captured image and the angle difference of the standard reference mark, adjusting one or more of the horizontal angle, the pitch angle and the rotation angle of the camera, so as to realize the calibration of the camera installation angle.

For example, when the display unit of the electronic device displays that the standard reference mark is located on the right side of the target object in the captured image, and then the horizontal angle of the camera is adjusted to the left by the corresponding angle so that the standard reference mark coincides with the target object.

2. The Sensor to-be-Detected is a Laser-Radar

Exemplarily, according to the position of the target object in the captured point cloud and the angle difference of the standard reference mark, adjusting one or more of the horizontal angle, the pitch angle and the rotation angle of the laser-radar, so as to realize the calibration of the laser-radar installation angle. Optionally, the laser-radar can be fixed on a rotatable base during installation, and the installation angle of the laser-radar can be adjusted by adjusting one or more of the horizontal angle, pitch angle, and rotation angle of the base.

The adjustment manner is similar to that of the camera.

S303. Fixing the sensor to-be-detected.

When the installation angle of the sensor to-be-detected is adjusted to the standard state, that is, when the standard reference mark coincides with the target object in the capturing result, the sensor to-be-detected is fixed.

In this embodiment, detect the installation angle of the sensor to-be-detected according to the position of the target object in the capturing result and the standard reference mark and output the second detection result. Further, according to the position of the target object in the capturing result and the standard reference mark, adjust one or more of the horizontal angle, the pitch angle and the rotation angle of the sensor to-be-detected, and then fix the sensor to-be-detected. The method of the embodiment can effectively ensure the accuracy of the detection result by automatically identifying whether the installation angle of the sensors is correct, and effectively improve the detection efficiency. In addition, it is adjusted according to the position of the target object in the capturing result and the installation angle of the sensor to-be-detected by the standard reference mark, which has high reliability.

The method provided by the embodiment of the present disclosure effectively ensures the reliability of the vehicle to-be-detected by means of detecting and calibrating the installation position and installation angle of the sensor to-be-detected. Moreover, due to the high accuracy of the sensor installation position and the installation angle, the accuracy of the sensor detection data is improved, and the complexity of the environment perception algorithm can be effectively reduced.

Figure 4:
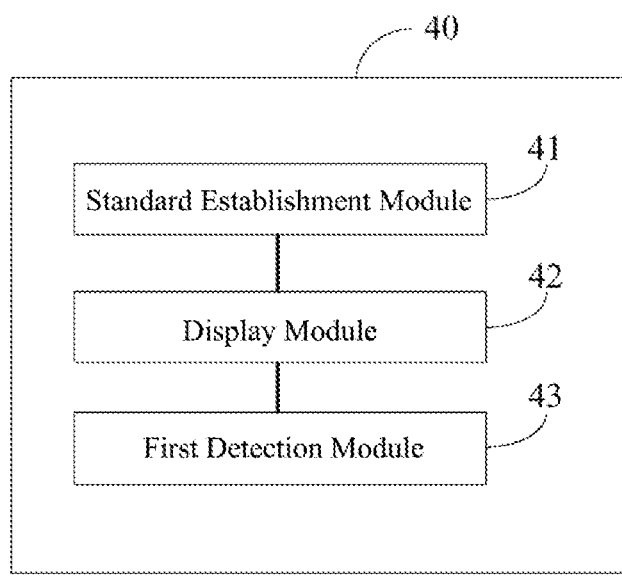
FIG. 4 is a schematic structural diagram of Embodiment I of a detection apparatus for an automatic driving sensor provided by the present disclosure.

FIG. 4 is a schematic structural diagram of Embodiment I of a detection apparatus for an automatic driving sensor provided by the present disclosure. As shown in FIG. 4, the apparatus 40 of this embodiment includes: a standard establishment module 41, a display module 42 and a first detection module 43.

The standard establishment module 41 is configured to establish a standard association relationship in advance, where the standard association relationship is a corresponding relationship between ID information and a standard capturing result of a sensor to-be-detected in a fixed scene when the sensor to-be-detected is correctly installed.

The display module 42 is configured to display a corresponding capturing result when the sensor to-be-detected is used for capturing in a fixed scene.

The first detection module 43 is configured to output a first detection result according to the capturing result and the standard association relationship, and the first detection result is configured to indicate whether an installation sequence of the sensor to-be-detected is correct.

Optionally, the sensor to-be-detected includes: a camera or a laser-radar. Correspondingly, the capturing result of the camera is a captured image, and the capturing result of the laser-radar is a captured point cloud.

The apparatus in this embodiment can be used to implement the technical solution of the method embodiment shown in FIG. 1, and its implementation principles and technical effects are similar, and will not be repeated here.

Figure 5:
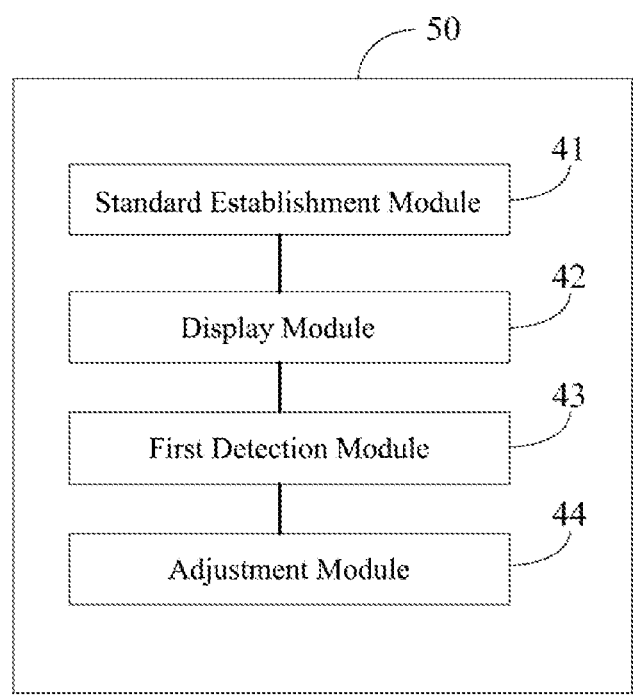
FIG. 5 is a schematic structural diagram of Embodiment II of a detection apparatus for an automatic driving sensor provided by the present disclosure.

FIG. 5 is a schematic structural diagram of Embodiment II of a detection apparatus for an automatic driving sensor provided by the present disclosure. As shown in FIG. 5, on the basis of the embodiment shown in FIG. 4, the apparatus 50 of this embodiment further includes: an adjustment module 44.

The adjustment module 44 is configured to adjust the installation sequence of the sensors to-be-detected according to the standard association relationship when the installation sequence of the sensors to-be-detected is incorrect.

The apparatus in this embodiment can be used to implement the technical solution of the method embodiment shown in FIG. 2, and its implementation principles and technical effects are similar, and will not be repeated here.

Figure 6:
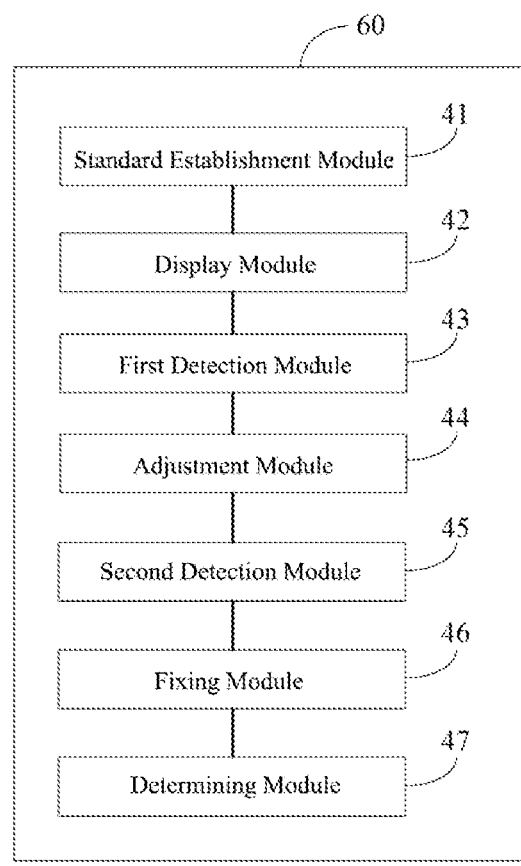
FIG. 6 is a schematic structural diagram of Embodiment III of a detection apparatus for an automatic driving sensor provided by the present disclosure.

FIG. 6 is a schematic structural diagram of Embodiment III of a detection apparatus for an automatic driving sensor provided by the present disclosure. As shown in FIG. 6, on the basis of the embodiment shown in FIG. 5, the apparatus 60 of this embodiment further includes: a second detection module 45, a fixing module 46, and a determining module 47.

The second detection module 45 is configured to detect an installation angle of the sensor to-be-detected according to a position of a target object in the capturing result and a standard reference mark, and output a second detection result, where the second detection result is configured to indicate whether the installation angle of the sensor to-be-detected is accurate.

Correspondingly, the adjustment module 44 is also configured to adjust one or more of a horizontal angle, a pitch angle and a rotation angle of the sensor to-be-detected, according to the position of the target object in the capturing result and the standard reference mark when the installation angle of the sensor to-be-detected is not accurate.

Further, the fixing module 46 is configured to fix the sensor to-be-detected, after the adjustment module adjusting one or more of a horizontal angle, a pitch angle and a rotation angle of the sensor to-be-detected, according to the position of the target object in the capturing result and the standard reference mark.

The determining module 47 is configured to determine a standard reference mark through following manners:

identifying one target object in the standard capturing result, and setting a standard reference mark at the position of the target object, which is a contour line of the target object, a horizontal line, or a vertical line; or identifying multiple target objects in the standard capturing result, and setting a standard reference mark at the positions of the multiple target objects, which is a line connecting center points of the multiple target objects.

The apparatus in this embodiment can be used to implement the technical solution of the method embodiment shown in FIG. 3, and its implementation principles and technical effects are similar, and will not be repeated here.

Figure 7:
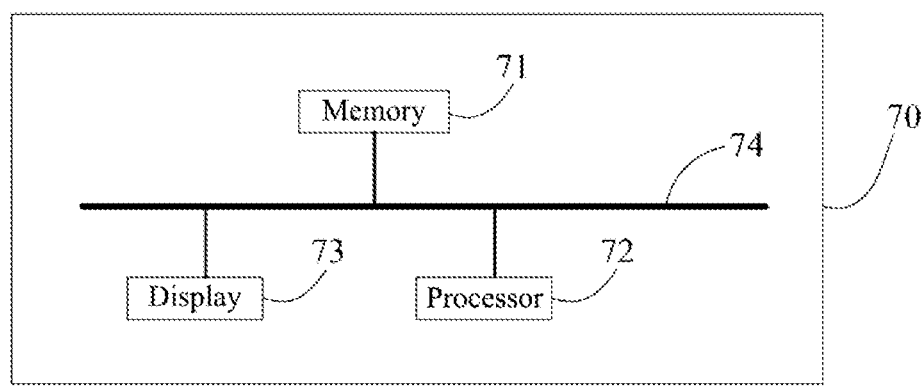
FIG. 7 is a schematic structural diagram of Embodiment I of an electronic device provided by the present disclosure.

FIG. 7 is a schematic structural diagram of Embodiment I of an electronic device provided by the present disclosure. As shown in FIG. 7, the apparatus 70 in this embodiment includes: a memory 71, a processor 72, and a display 73.

The memory 71 may be an independent physical unit, and may be connected to the processor 72 through a bus 74. The memory 71 and the processor 72 may also be integrated together and implemented by hardware.

The memory 71 is used to store a computer program that implements the above method embodiment, and the processor 72 invokes the computer program to execute the operation of the above method embodiment.

Further, the display 73 is connected to the processor 72 via the bus 74, and is used for displaying the capturing result of the sensor to-be-detected in a fixed scene.

If the sensor to-be-detected is a camera, correspondingly, the capturing result is a captured image, then the display 73 displays the captured image; if the sensor to-be-detected is a laser-radar, correspondingly, the capturing result is a captured point cloud, then the display 73 displays the captured point cloud.

Optionally, when part or all of the methods in the foregoing embodiments are implemented by software, the foregoing electronic device 70 may also only include a processor and a display 73. The memory for storing the program is located outside the electronic device 70, and the processor is connected to the memory through a circuit/wire for reading and executing the computer program stored in the memory.

The processor 72 may be a central processing unit (Central Processing Unit, CPU), a network processor (Network Processor, NP), or a combination of a CPU and NP.

The processor 72 may further include a hardware chip. The foregoing hardware chip may be an application-specific integrated circuit (Application-Specific Integrated Circuit, ASIC), a programmable logic device (Programmable Logic Device, PLD), or a combination thereof. The above-mentioned PLD may be a complex programmable logic device (Complex Programmable Logic Device, CPLD), a Field-Programmable Gate Array (FPGA), a Generic Array Logic (GAL) or any combination thereof.

The memory 71 may include a volatile memory (Volatile Memory), such as a random-access memory (Random-Access Memory, RAM); the memory may also include a non-volatile memory (Non-volatile Memory), such as a flash memory (Flash Memory), a hard disk drive (Hard Disk Drive, HDD) or a solid-state drive (Solid-state Drive, SSD); the memory may also include a combination of the above types of memory.

In addition, the present disclosure also provides a program product, for example, a computer-readable storage medium, including: a computer program, which is used to execute the foregoing method when executed by a processor.

A person of ordinary skilled in the art can understand that all or part of the steps in the foregoing method embodiments can be implemented by a program instructing relevant hardware. The foregoing program can be stored in a computer readable storage medium. When the program is executed, it executes the steps including the foregoing method embodiments; and the foregoing storage medium includes: ROM, RAM, magnetic disk, or optical disk and other mediums that can store program codes.

Finally, it should be noted that the above embodiments are only used to illustrate the technical solutions of the present disclosure, but not to limit them. Although the present disclosure has been described in detail with reference to the foregoing embodiments, those of ordinary skilled in the art should understand that they can still modify the technical solutions described in the foregoing embodiments, or equivalently replace some or all of the technical features. However, these modifications or replacements do not cause the essence of the corresponding technical solutions to deviate from the scope of the technical solutions of the embodiments of the present disclosure.

What is claimed is:

1. A detection method for sensors to-be-detected, comprising:

pre-establishing a standard association relationship, wherein the standard association relationship is a corresponding relationship between ID information and a standard capturing result of the sensors to-be-detected in a fixed scene when the sensors to-be-detected are correctly installed;

using the sensors to-be-detected to capture in a fixed scene and obtain a corresponding capturing result; and outputting a first detection result according to the capturing result and the standard association relationship, wherein the first detection result is configured to indicate whether an installation sequence of the sensors to-be-detected is correct;

wherein the method further comprises:

detecting installation angles of the sensors to-be-detected according to a position of a target object in the capturing result and a standard reference mark, and outputting a second detection result, wherein the second detection result is configured to indicate whether the installation angles of the sensors to-be-detected are accurate.

2. The method according to claim 1, wherein the sensors to-be-detected comprise: cameras or laser-radar; and correspondingly, the capturing result of each camera is a captured image, and the capturing result of each laser-radar is a captured point cloud.

3. The method according to claim 1, wherein if the installation sequence of the sensors to-be-detected is incorrect, the method further comprises:

adjusting the installation sequence of the sensors to-be-detected according to the standard association relationship.

4. The method according to claim 1, wherein if the installation angle of the sensors to-be-detected is not accurate, the method further comprises:

adjusting one or more of a horizontal angle, a pitch angle and a rotation angle of the sensors to-be-detected, according to the position of the target object in the capturing result and the standard reference mark.

5. The method according to claim 4, wherein after the adjusting one or more of a horizontal angle, a pitch angle and a rotation angle of the sensors to-be-detected, according to the position of the target object in the capturing result and the standard reference mark, further comprising:

fixing the sensors to-be-detected.

6. The method according to claim 1, wherein the standard reference mark is determined through following manners:

identifying one target object in the standard capturing result, and setting a standard reference mark at the position of the target object, which is a contour line of the target object, a horizontal line, or a vertical line.

7. The method according to claim 1, wherein the standard reference mark is determined through following manners:

identifying multiple target objects in the standard capturing result, and setting a standard reference mark at the positions of the multiple target objects, wherein the standard reference mark is a line connecting center points of the multiple target objects.

8. A non-transitory computer-readable storage medium, wherein the storage medium stores a computer program, and when the computer program is executed by a processor, the method according to claim 1 is executed.

9. An electronic device for sensors to-be-detected, comprising a memory, a processor and a display, wherein, the electronic device further comprises the sensors to-be-detected;

the memory is configured to store instructions;

the display is configured to display a capturing result of the sensors to-be-detected in a fixed scene;

the processor is configured to execute the instructions, and the instructions are executed by the processor to cause the processor to:

pre-establish a standard association relationship, wherein the standard association relationship is a corresponding relationship between ID information and a standard capturing result of the sensors to-be-detected in a fixed scene when the sensors to-be-detected are correctly installed;

use the sensors to-be-detected to capture in a fixed scene to obtain a corresponding capturing result; and output a first detection result according to the capturing result and the standard association relationship, wherein the first detection result is configured to indicate whether an installation sequence of the sensors to-be-detected is correct;

wherein the processor is further caused to: detect installation angles of the sensors to-be-detected according to a position of a target object in the capturing result and a standard reference mark, and output a second detection result, wherein the second detection result is configured to indicate whether the installation angle of the sensors to-be-detected is accurate.

10. The electronic device according to claim 9, wherein the sensors to-be-detected comprise: cameras or laser-radar; and correspondingly, the capturing result of each camera is a captured image, and the capturing result of each laser-radar is a captured point cloud.

11. The electronic device according to claim 9, wherein if the installation sequence of the sensors to-be-detected is incorrect, the processor is further caused to:

adjust the installation sequence of the sensors to-be-detected according to the standard association relationship.

12. The electronic device according to claim 9, wherein if the installation angle of the sensors to-be-detected is not accurate, the processor is further caused to:

adjust one or more of a horizontal angle, a pitch angle and a rotation angle of the sensors to-be-detected, according to the position of the target object in the capturing result and the standard reference mark.

13. The electronic device according to claim 12, wherein, after being caused to adjust one or more of a horizontal angle, a pitch angle and a rotation angle of the sensors to-be-detected, according to the position of the target object in the capturing result and the standard reference mark, the processor is further caused to:

fix the sensors to-be-detected.

14. The electronic device according to claim 9, wherein the standard reference mark is determined through following manners:

identifying one target object in the standard capturing result, and setting a standard reference mark at the position of the target object, which is a contour line of the target object, a horizontal line, or a vertical line.

15. The electronic device according to claim 9, wherein the standard reference mark is determined through following manners:

identifying multiple target objects in the standard capturing result, and setting a standard reference mark at the positions of the multiple target objects, wherein the standard reference mark is a line connecting center points of the multiple target objects.

* * * * *